(12) United States Patent
Kitamura et al.

(10) Patent No.: US 12,478,341 B2
(45) Date of Patent: Nov. 25, 2025

(54) INTRA-ORAL IMAGING SYSTEM AND IMAGING APPARATUS

(71) Applicant: HAMAMATSU PHOTONICS K.K., Hamamatsu (JP)

(72) Inventors: Shigehiro Kitamura, Hamamatsu (JP); Kazuhisa Miyaguchi, Hamamatsu (JP)

(73) Assignee: HAMAMATSU PHOTONICS K.K., Shizuoka (JP)

( * ) Notice: Subject to any disclaimer, the term of this patent is extended or adjusted under 35 U.S.C. 154(b) by 0 days.

(21) Appl. No.: 18/267,911

(22) PCT Filed: Jan. 4, 2022

(86) PCT No.: PCT/JP2022/000046
§ 371 (c)(1),
(2) Date: Jun. 16, 2023

(87) PCT Pub. No.: WO2022/172646
PCT Pub. Date: Aug. 18, 2022

(65) Prior Publication Data
US 2024/0057961 A1    Feb. 22, 2024

(30) Foreign Application Priority Data

Feb. 12, 2021 (JP) ................. 2021-020625

(51) Int. Cl.
*A61B 6/51* (2024.01)
*A61B 6/00* (2006.01)
*A61B 6/42* (2024.01)

(52) U.S. Cl.
CPC .............. *A61B 6/512* (2024.01); *A61B 6/425* (2013.01); *A61B 6/542* (2013.01)

(58) Field of Classification Search
CPC ......... A61B 6/512; A61B 6/425; A61B 6/542; A61B 6/42; A61B 6/54
See application file for complete search history.

(56) References Cited

U.S. PATENT DOCUMENTS

2013/0121464 A1   5/2013   Tajima
2015/0078528 A1   3/2015   Okada
(Continued)

FOREIGN PATENT DOCUMENTS

CN    104220000 A    12/2014
CN    104887256 A    9/2015
(Continued)

OTHER PUBLICATIONS

International Preliminary Report on Patentability mailed Aug. 24, 2023 for PCT/JP2022/000046.

*Primary Examiner* — David P Porta
*Assistant Examiner* — Mamadou Faye
(74) *Attorney, Agent, or Firm* — Faegre Drinker Biddle & Reath LLP

(57) ABSTRACT

An intra-oral imaging system includes an imaging device and a control device. The imaging device includes an imager, a controller, and a case in which the imager and the controller are housed. The imager performs imaging detection for detecting radiation in order to acquire an image of an object and monitoring detection for detecting radiation in order to monitor the dose of radiation. The controller transmits an imaging signal and a monitoring signal to the control device, the imaging signal acquired by the imaging detection and the monitoring signal acquired by the monitoring detection. The control device receives the imaging signal and the monitoring signal, and transmits a control command to the controller, the control command generated based on the monitoring signal. The controller controls the imager according to the control command.

10 Claims, 6 Drawing Sheets

(56) References Cited

U.S. PATENT DOCUMENTS

| | | | |
|---|---|---|---|
| 2017/0188987 A1 | 7/2017 | Liu et al. | |
| 2018/0070898 A1* | 3/2018 | Kravis | A61B 6/587 |
| 2019/0209117 A1* | 7/2019 | Duewer | A61B 6/545 |
| 2020/0315434 A1 | 10/2020 | Kopelman et al. | |
| 2021/0169436 A1* | 6/2021 | Cao | A61B 6/542 |
| 2022/0313178 A1* | 10/2022 | Yamakawa | A61B 6/4241 |

FOREIGN PATENT DOCUMENTS

| | | |
|---|---|---|
| JP | H8-275942 A | 10/1996 |
| JP | H11-188033 A | 7/1999 |
| JP | 2006-246961 A | 9/2006 |
| JP | 5715960 B2 | 5/2015 |
| WO | WO-2010/061086 A1 | 6/2010 |

* cited by examiner

INTRA-ORAL IMAGING SYSTEM AND IMAGING APPARATUS

TECHNICAL FIELD

The present disclosure relates to an intra-oral imaging system and an imaging device.

BACKGROUND ART

An imaging device that detects radiation transmitted through an object while being placed in the oral cavity is known. In such an imaging device, the dose of radiation is monitored, and radiation detection for acquiring an image of the object (that is, imaging of the object) ends when the dose of radiation decreases to a predetermined threshold value. However, depending on the type of object (front tooth, back tooth, and the like) and/or the type of imaging method (parallel method, bisection method, bitewing method, occlusal method, and the like), the total dose of radiation necessary and sufficient to appropriately acquire an image of the object changes. For this reason, when the imaging of the object ends based only on the dose of radiation, the image of the object may not be appropriately acquired. Therefore, in an imaging device described in Patent Literature 1, a control module is provided separately from a sensor used in a state of being placed in the oral cavity, and the sensor transmits a signal related to the dose of radiation to the control module and the control module analyzes the signal to determine the end timing of the imaging of the object.

CITATION LIST

Patent Literature

Patent Literature 1: Japanese Patent No. 5715960

SUMMARY OF INVENTION

Technical Problem

However, in the imaging device described in Patent Literature 1, it is assumed that the control module provided separately from the sensor is connected to a control device, such as a PC. For this reason, the handleability of the imaging device may become worse. For example, the control module may become an obstacle when the sensor is placed in the oral cavity. On the other hand, for example, if the sensor and the control module are housed in a single case, the handleability of the imaging device is improved, but there is a concern that the imaging device may generate heat in the oral cavity due to the analysis of a signal related to the dose of radiation being performed by the control module placed in the oral cavity.

It is an object of the present disclosure to provide an intra-oral imaging system and an imaging device capable of appropriately acquiring an image of an object, improving the handleability of the imaging device, and suppressing the heat generation of the imaging device in the oral cavity.

Solution to Problem

An intra-oral imaging system according to one aspect of the present disclosure includes: an imaging device that detects radiation transmitted through an object while being placed in an oral cavity; and a control device electrically connected to the imaging device. The imaging device includes: an imager that detects the radiation; a controller that is configured to be communicable with the control device and controls the imager; and a case in which the imager and the controller are housed. The imager performs first detection for detecting the radiation in order to acquire an image of the object and second detection for detecting the radiation in order to monitor a dose of the radiation. The controller transmits a first signal and a second signal to the control device, the first signal acquired by the first detection and the second signal acquired by the second detection. The control device receives the first signal and the second signal and transmits a control command to the controller, the control command generated based on the second signal. The controller receives the control command and controls the imager according to the control command.

In the intra-oral imaging system described above, the control device receives the second signal related to the dose of radiation and transmits the control command to the controller, the control command generated based on the second signal, and the controller receives the control command and controls the imager according to the control command. Therefore, it is possible to determine the end timing of imaging of the object according to the type of object and/or the type of imaging method, for example. As a result, it is possible to appropriately acquire an image of the object. In addition, in the intra-oral imaging system described above, the imager and the controller are housed in the case. Therefore, it is possible to avoid a problem that occurs when the controller is provided separately from the imager, that is, a problem that the controller becomes an obstacle when the imager is placed in the oral cavity. In addition, in the intra-oral imaging system described above, the control device generates a control command based on the second signal related to the dose of radiation. Therefore, it is possible to reduce the processing load of the controller on the imaging device side. As a result, it is possible to reduce the size of the imaging device and suppress the heat generation of the imaging device. As described above, according to the intra-oral imaging system described above, it is possible to appropriately acquire an image of the object, improve the handleability of the imaging device, and suppress the heat generation of the imaging device in the oral cavity.

In the intra-oral imaging system according to one aspect of the present disclosure, the control device may generate the image of the object based on the first signal. According to this, it is possible to reliably generate the image of the object.

In the intra-oral imaging system according to one aspect of the present disclosure, the control command may include an end command for ending the first detection, and the controller may control the imager to end the first detection when the end command is received. According to this, it is possible to end the radiation detection for acquiring an image of the object at an appropriate timing according to the type of object and/or the type of imaging method, for example. As a result, it is possible to appropriately acquire the image of the object.

In the intra-oral imaging system according to one aspect of the present disclosure, the control device may generate the end command when a total dose of the radiation calculated based on the second signal exceeds a predetermined threshold value. According to this, it is possible to end the radiation detection for acquiring an image of the object with an appropriate total dose according to the type of object and/or the type of imaging method, for example. As a result, it is possible to appropriately acquire the image of the object.

In the intra-oral imaging system of one aspect of the present disclosure, the threshold value may be stored for each of imaging conditions for the object by the control device, and the control device may receive an input of an imaging condition being one of the imaging conditions, and set the threshold value corresponding to the imaging condition. According to this, since an appropriate threshold value is set according to the input imaging condition, an image of the object can be appropriately acquired regardless of the type of object and/or the type of imaging method, for example.

In the intra-oral imaging system according to one aspect of the present disclosure, the control device may receive the imaging condition including object information regarding the object and sets the threshold value corresponding to the object information. According to this, since an appropriate threshold value is set according to the object to be imaged, it is possible to appropriately acquire the image of the object regardless of the type of object.

In the intra-oral imaging system according to one aspect of the present disclosure, the control device may receive the imaging condition including imaging method information regarding a method for imaging the object and set the threshold value corresponding to the imaging method information. According to this, since an appropriate threshold value according to the object imaging method is set, it is possible to appropriately acquire the image of the object regardless of the type of imaging method.

In the intra-oral imaging system according to one aspect of the present disclosure, the controller may be configured to be communicable with the control device by wire. According to this, it is possible to secure a stable communication environment between the controller and the control device. In addition, since the imager and the controller are housed in the single case, the problem that the controller becomes an obstacle when the imager is placed in the oral cavity can be avoided even in a configuration in which the controller and the control device are physically connected to each other by wire.

An imaging device according to one aspect of the present disclosure is an imaging device for detecting radiation transmitted through an object while being placed in an oral cavity. The imaging device includes: an imager that detects the radiation; a controller that is configured to be communicable with the control device and controls the imager; and a case in which the imager and the controller are housed. The imager performs first detection for detecting the radiation in order to acquire an image of the object and second detection for detecting the radiation in order to monitor a dose of the radiation. The controller transmits a first signal and a second signal to the control device, receives a control command from the control device, and controls the imager according to the control command, the first signal acquired by the first detection and the second signal acquired by the second detection.

In the imaging device described above, the controller transmits the second signal to the control device, the second signal acquired by the second detection, receives the control command from the control device, and controls the imager according to the control command. Therefore, the control device can determine the end timing of imaging of the object according to the type of object and/or the type of imaging method based on the second signal, for example. As a result, it is possible to appropriately acquire the image of the object. In addition, in the imaging device described above, the imager and the controller are housed in the case. Therefore, it is possible to avoid a problem that occurs when the controller is provided separately from the imager, that is, a problem that the controller becomes an obstacle when the imager is placed in the oral cavity. In addition, in the imaging device described above, the control device generates the control command. Therefore, it is possible to reduce the processing load of the controller on the imaging device side. As a result, it is possible to reduce the size of the imaging device and suppress the heat generation of the imaging device. As described above, according to the imaging device described above, it is possible to appropriately acquire the image of the object, improve the handleability of the imaging device, and suppress the heat generation of the imaging device in the oral cavity.

Advantageous Effects of Invention

According to the present disclosure, it is possible to provide an intra-oral imaging system and an imaging device capable of appropriately acquiring an image of an object, improving the handleability of the imaging device, and suppressing the heat generation of the imaging device in the oral cavity.

DESCRIPTION OF EMBODIMENTS

Figure 1:
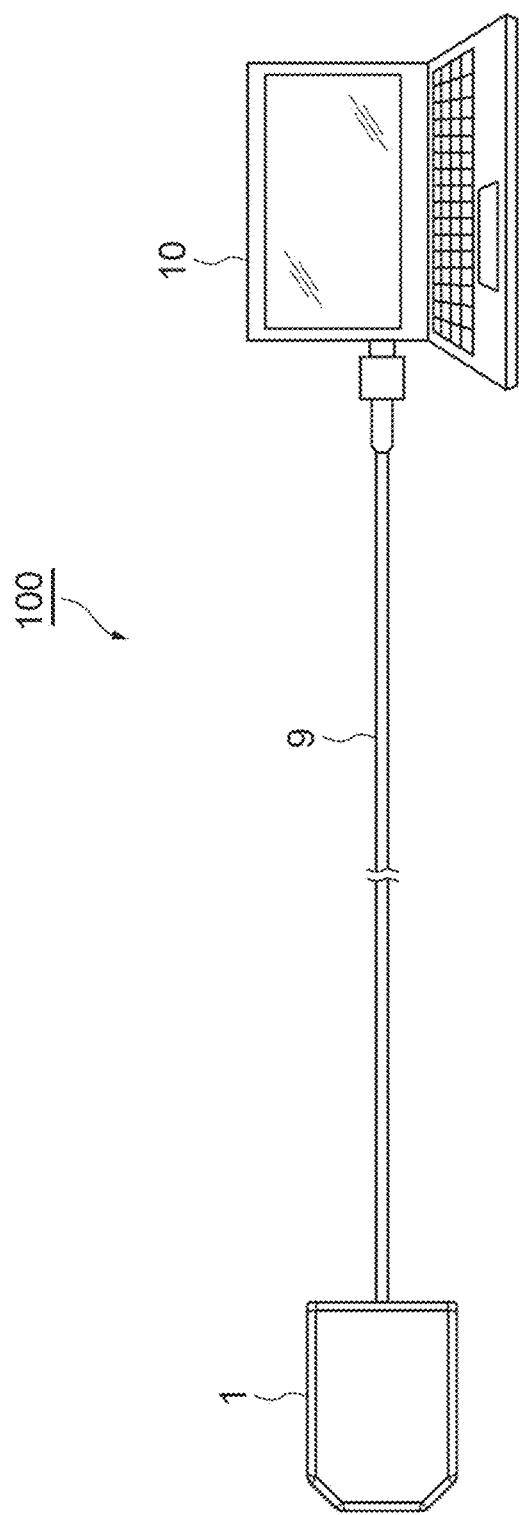
FIG. 1 is a configuration diagram of an intra-oral imaging system according to an embodiment.

Hereinafter, embodiments of the present disclosure will be described in detail with reference to the diagrams. In addition, the same or equivalent portions in the diagrams are denoted by the same reference numerals, and repeated description thereof will be omitted.

[Configuration of Intra-Oral Imaging System]

As shown in FIG. 1, an intra-oral imaging system 100 includes an imaging device 1 and a control device 10. The imaging device 1 detects radiation (for example, X-rays) transmitted through an object, such as a tooth, while being placed in the oral cavity. The imaging device 1 is electrically connected to the control device 10 through a cable 9 provided in the imaging device 1. The imaging device 1 and the control device 10 transmit and receive signals (that is, perform communication) therebetween through the cable 9. The control device is, for example, a computer device such as a PC or a tablet terminal. In the intra-oral imaging system 100, when radiation transmitted through the object is detected by the imaging device 1, an electrical signal generated by the radiation detection is transmitted from the imaging device 1 to the control device 10, and the control device 10 generates an image (radiation transmission image) of the object based on the electrical signal.

[Configuration of Imaging Device]

Figure 2:
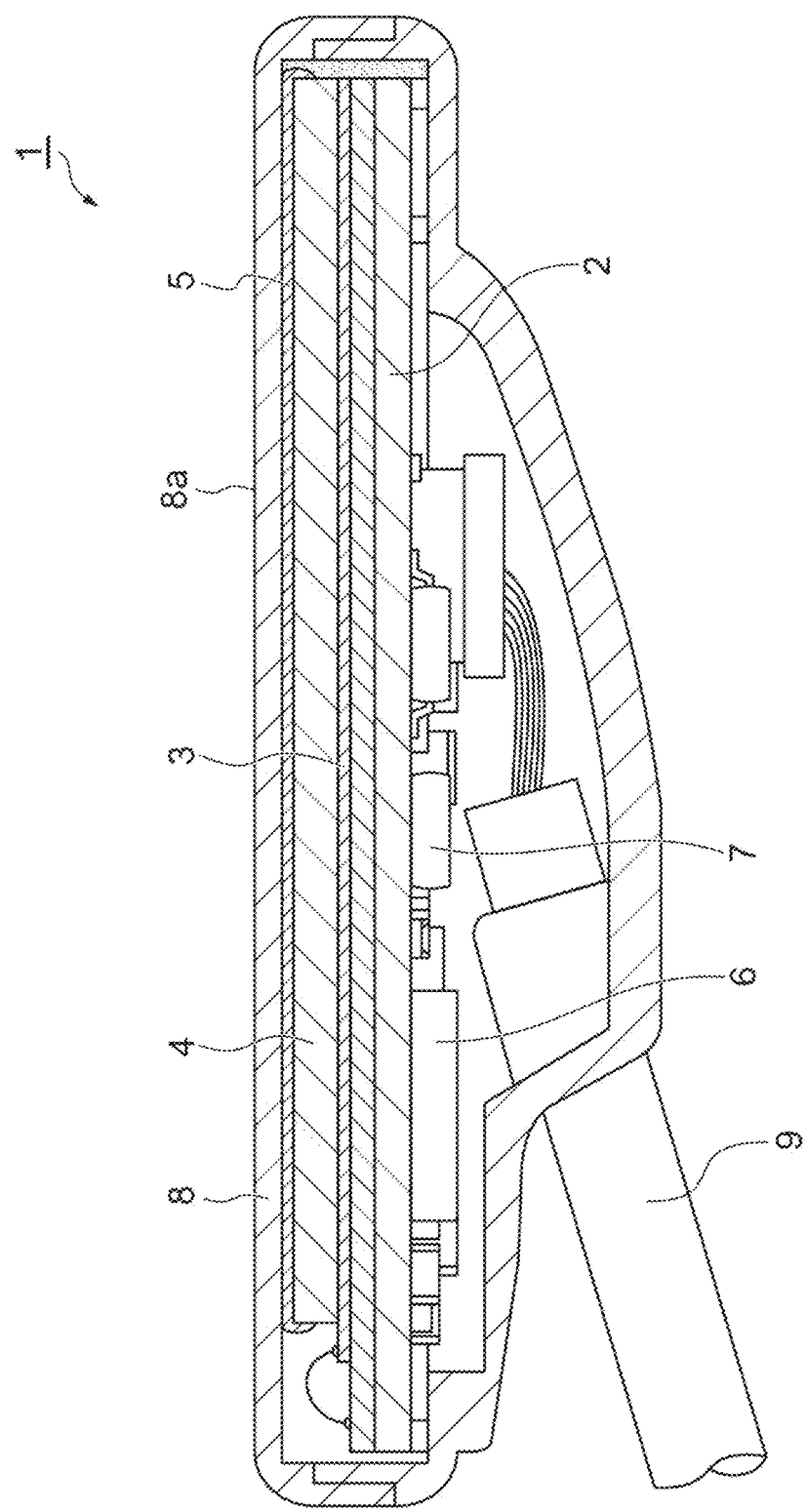
FIG. 2 is a cross-sectional view of an imaging device shown in FIG. 1.

As shown in FIG. 2, the imaging device 1 includes a wiring board 2, an image sensor 3, an FOP (Fiber Optical Plate) 4, a scintillator 5, a control circuit 6, a communication module 7, a case 8, the cable 9. The image sensor 3 is mounted on one main surface of the wiring board 2. The image sensor 3 is, for example, a solid state imaging device such as a CMOS image sensor. The FOP 4 is arranged on the image sensor 3. The scintillator 5 is arranged on the FOP 4. The imaging device 1 receives power supplied from the control device 10 (see FIG. 1) through the cable 9, for example.

The control circuit 6 and the communication module 7 are mounted on the other main surface of the wiring board 2. The control circuit 6 is, for example, an integrated circuit such as an FPGA (field-programmable gate), an ASIC (Application Specific Integrated Circuit), a CPLD (Complex Programmable Logic Device), or a CPU (Central Processing Unit). The control circuit 6 performs various controls in the imaging device 1. The communication module 7 communicates with the control device 10 according to an instruction from the control circuit 6. The communication module 7 receives various kinds of data transmitted from the control device 10. The communication module 7 is, for example, an integrated circuit such as a USB (Universal Serial Bus) controller. As an example, the communication module 7 is a USB controller, and communicates with the control device 10 according to the USB standard.

The wiring board 2, the image sensor 3, the FOP 4, the scintillator 5, the control circuit 6, and the communication module 7 are housed in the case 8. A wall portion 8a along the scintillator 5 among wall portions of the case 8 is a wall portion on which radiation is to be incident. An end portion of the cable 9 passing through a wall portion of the case 8 opposite to the wall portion 8a is electrically connected to the wiring board 2. As an example, the cable 9 is a USB cable.

Figure 3:
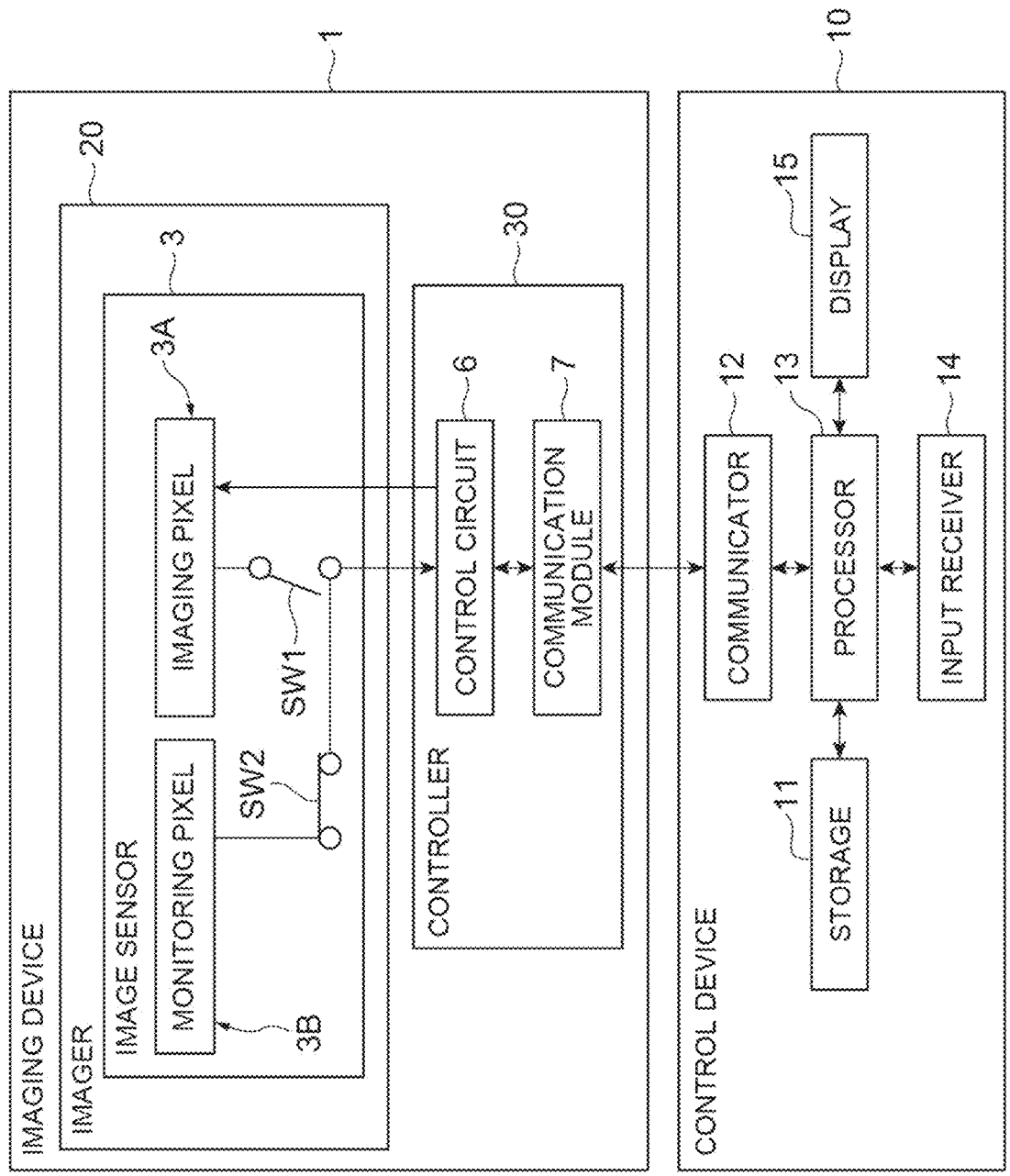
FIG. 3 is a block diagram of the imaging device and a control device shown in FIG. 1.

As shown in FIG. 3, the imaging device 1 has an imager 20 and a controller 30. The imager 20 is formed by the image sensor 3, the FOP 4, and the scintillator 5 described above. The controller 30 is formed by the control circuit 6 and the communication module 7 described above. The controller 30 performs communication with the imager 20, communication with the control device 10, and control of the imager 20. The imager 20 is electrically connected to the controller 30 by a wiring (not shown) inside the case 8. The imager 20 and the controller 30 transmit and receive signals (that is, perform communication) therebetween through the wiring. The controller 30 is configured to be able to communicate with the control device 10 by wire. Specifically, the controller 30 is configured to be able to communicate with the control device 10 through the cable 9 (see FIG. 1).

In the imaging device 1 configured as described above, when radiation transmitted through the object passes through the wall portion 8a of the case 8 to be incident on the scintillator 5 of the controller 30 in a state in which the case 8 is placed in the oral cavity, fluorescence corresponding to the intensity of the incident radiation is emitted from the scintillator 5. When the fluorescence is guided by the FOP 4 to be incident on the image sensor 3, an electrical signal corresponding to the intensity of the incident fluorescence is generated in the image sensor 3, and the electrical signal is transmitted to the control circuit 6 of the controller 30 through the wiring inside the case 8.

The image sensor 3 of the imager 20 has a plurality of imaging pixels 3A and a plurality of monitoring pixels 3B. The plurality of imaging pixels 3A are arranged in a two-dimensional manner to form a photodetection region. The plurality of monitoring pixels 3B are arranged, for example, along the periphery of the plurality of imaging pixels 3A. In addition, the number of monitoring pixels 3B may be at least one.

The imager 20 performs imaging detection (first detection) for detecting radiation in order to acquire an image of an object by using the plurality of imaging pixels 3A, and outputs an imaging signal (first signal). Specifically, when the controller 30 controls the image sensor 3 to start imaging detection, each imaging pixel 3A converts the fluorescence emitted from the scintillator 5 due to the incidence of radiation into charges, and outputs the charges as an imaging signal. More specifically, by performing ON/OFF switching of a switch SW1, the controller 30 controls the image sensor 3 so that the charges generated in each imaging pixel 3A are output as an imaging signal. The switch SW1 is a switch provided in the image sensor 3, and is connected to the imaging pixel 3A and the control circuit 6. The switch SW1 is, for example, a transistor.

The imager 20 performs monitoring detection (second detection) for detecting radiation in order to monitor the dose of radiation by using the plurality of monitoring pixels 3B, and outputs a monitoring signal (second signal). Specifically, when the controller 30 controls the image sensor 3 to start monitoring detection, each monitoring pixel 3B converts the fluorescence emitted from the scintillator 5 due to the incidence of radiation into charges, and outputs the charges as a monitoring signal. More specifically, by performing ON/OFF switching of a switch SW2, the controller 30 controls the image sensor 3 so that the charges generated in each monitoring pixel 3B are output as a monitoring signal. The switch SW2 is a switch provided in the image sensor 3, and is connected to the monitoring pixel 3B and the control circuit 6. The switch SW2 is, for example, a transistor.

The controller 30 acquires an imaging signal and a monitoring signal from the imager 20 and transmits the imaging signal and the monitoring signal to the control device 10. The controller 30 receives a control command from the control device 10, and controls the imager according to the control command. The control command includes a first start command, a second start command, and an end command. The first start command is a command for starting monitoring detection for acquiring a monitoring signal. The controller 30 performs monitoring detection when the first start command is received from the control device 10. Specifically, as described above, the controller 30 controls the imager 20 so that each monitoring pixel 3B starts accumulating charges. The controller 30 ends the monitoring detection, for example, when a predetermined period of time passes. Specifically, as described above, the controller 30 controls the imager so that each monitoring pixel 3B ends accumulating charges. When the monitoring detection is ended and a monitoring signal is acquired from the imager 20, the controller 30 transmits the monitoring signal to the control device 10. More specifically, the controller 30 converts the monitoring signal acquired from the imager 20 into a signal conforming to the USB standard communication protocol, and transmits the converted monitoring signal to the control device 10. That is, the controller 30 causes the imager 20 to start monitoring the dose of radiation when the first start command is received from the control device 10 and to end the monitoring when a predetermined period of time passes, and transmits a monitoring signal, which is a result of the monitoring, to the control device 10.

The second start command is a command for starting imaging detection for acquiring an imaging signal. The end command is a command for ending imaging detection. The controller 30 performs imaging detection when the second start command is received from the control device 10. Specifically, as described above, the controller 30 controls the imager 20 so that each imaging pixel 3A starts accumulating charges. When the end command is received, the controller 30 ends the imaging detection. Specifically, as described above, the controller 30 controls the imager 20 so that each imaging pixel 3A ends accumulating charges. When the imaging detection is ended and an imaging signal is acquired from the imager 20, the controller 30 transmits the imaging signal to the control device 10. More specifically, the controller 30 converts the imaging signal acquired from the imager 20 into a signal conforming to the USB standard communication protocol, and transmits the converted imaging signal to the control device 10. That is, the controller 30 causes the imager 20 to start detection for acquiring an image of radiation when the second start command is received from the control device 10 and to end the detection when the end command is received, and transmits an imaging signal, which is a result of the detection, to the control device 10.

[Configuration of Control Device]

The control device 10 has a storage 11, a communicator 12, a processor 13, an input receiver 14, and a display 15. The storage 11 is, for example, a hard disk, and stores various kinds of data. The communicator 12 is, for example, a communication device. The processor 13 is, for example, a processor. The processor 13 executes software (program) read into a memory (not shown) or the like provided in the control device 10, and controls reading and writing of data in the memory or the like and communication by the communicator 12. The input receiver 14 is an interface that receives an input of various kinds of data from the user. The input receiver 14 is, for example, a keyboard or a mouse. The display 15 displays various kinds of information according to an instruction from the processor 13. The display 15 is, for example, a display device provided in the control device 10. In addition, the display 15 may form, for example, a GUI (Graphical User Interface) to function as an interface that receives an input of various kinds of data from the user.

The control device 10 functions as a higher-level controller than the controller 30. The control device 10 receives an input of imaging condition for an object from the user. The imaging condition is input, for example, by the user's input of object information and imaging method information to the input receiver 14. In the present embodiment, the object information is the type of object. The object is a part to be imaged in the oral cavity, for example, a back tooth and a front tooth. In the present embodiment, the imaging method information is the type of imaging method. Examples of the imaging method include a parallel method, a bisection method, a bitewing method, and an occlusal method.

When the input of the imaging condition is received, the control device 10 generates a first start command and transmits the first start command to the controller 30 of the imaging device 1. Then, the controller 30 starts monitoring detection for monitoring the dose of radiation. That is, when the imaging condition is input to the control device 10 by the user, the control device 10 causes the imaging device 1 to start monitoring detection as pre-stage processing for starting the acquisition of an image of the object.

Then, when a monitoring signal is received from the controller 30, the control device 10 generates a control command based on the monitoring signal and transmits the generated control command to the controller 30. Specifically, the control device 10 performs a known analysis (for example, the analysis described in Japanese Patent No. 5715960) such as estimating the dose of radiation based on the monitoring signal, and generates a first start command again and transmits the first start command to the controller 30 when the analysis result does not satisfy the conditions for starting the imaging detection. On the other hand, when the analysis result satisfies the conditions for starting the imaging detection, the control device 10 generates a second start command and transmits the second start command to the controller 30. Then, after the second start command is transmitted to the controller 30, the controller 30 generates a first start command again and transmits the first start command to the controller 30. As a result, in the imaging device 1, monitoring detection for monitoring the dose of radiation and imaging detection for acquiring an image of the object are started. That is, the control device 10 causes the imaging device 1 to start radiation detection for acquiring an image of the object and to continue monitoring the dose of radiation in order to acquire an appropriate image of the object.

Then, when a monitoring signal is received again from the controller 30, the control device 10 generates a control command based on the monitoring signal and transmits the generated control command to the controller 30. Specifically, the control device 10 performs an analysis based on the dose of radiation indicated by the monitoring signal. As the analysis described above, the control device 10 calculates the total dose of radiation calculated based on the monitoring signal. Specifically, the control device 10 estimates the total dose of radiation received by the plurality of imaging pixels 3A based on the monitoring signal. In the present embodiment, a correlation between the dose of radiation indicated by the monitoring signal (that is, detected by plurality of monitoring pixels 3B) and the dose of radiation actually incident on the oral cavity is calculated in advance. The control device calculates the total dose of radiation received by the plurality of imaging pixels 3A by performing a known calculation (for example, the calculation described in Japanese Patent No. 5715960) based on the correlation.

The control device 10 determines whether or not the analysis result satisfies the imaging detection end conditions. Specifically, the control device 10 sets a predetermined threshold value, and determines that the imaging detection end conditions are satisfied when the calculated total dose exceeds the threshold value. A threshold value is stored for each of the imaging conditions for the object in the storage 11 by the control device 10. The control device 10 sets a threshold value corresponding to an imaging condition being one of the imaging conditions and being received by the input receiver 14, with reference to the stored threshold value for each of the imaging conditions for the object. In the present embodiment, A threshold value is stored for each combination of the type of object and the type of imaging method by the control device 10, and the control device 10 sets a threshold value corresponding to the object information and the imaging method information received by the input receiver 14. A detailed method for setting the threshold value will be described later.

When the analysis result does not satisfy the imaging detection end conditions, the control device 10 generates a first start command again and transmits the first start command to the controller 30. On the other hand, when the analysis result satisfies the imaging detection end conditions, the control device 10 generates an end command and transmits the end command to the controller 30. As a result, in the imaging device 1, imaging detection for acquiring an image of the object is ended, and an imaging signal is transmitted to the control device 10. That is, the control device 10 determines an appropriate end timing of the imaging detection by performing the above analysis, and ends the imaging detection performed in the imaging device 1. When an imaging signal is received from the controller 30, the control device 10 generates an image of the object based on the received imaging signal. As a result, imaging of the object is performed.

[Imaging Processing]

Figure 4:
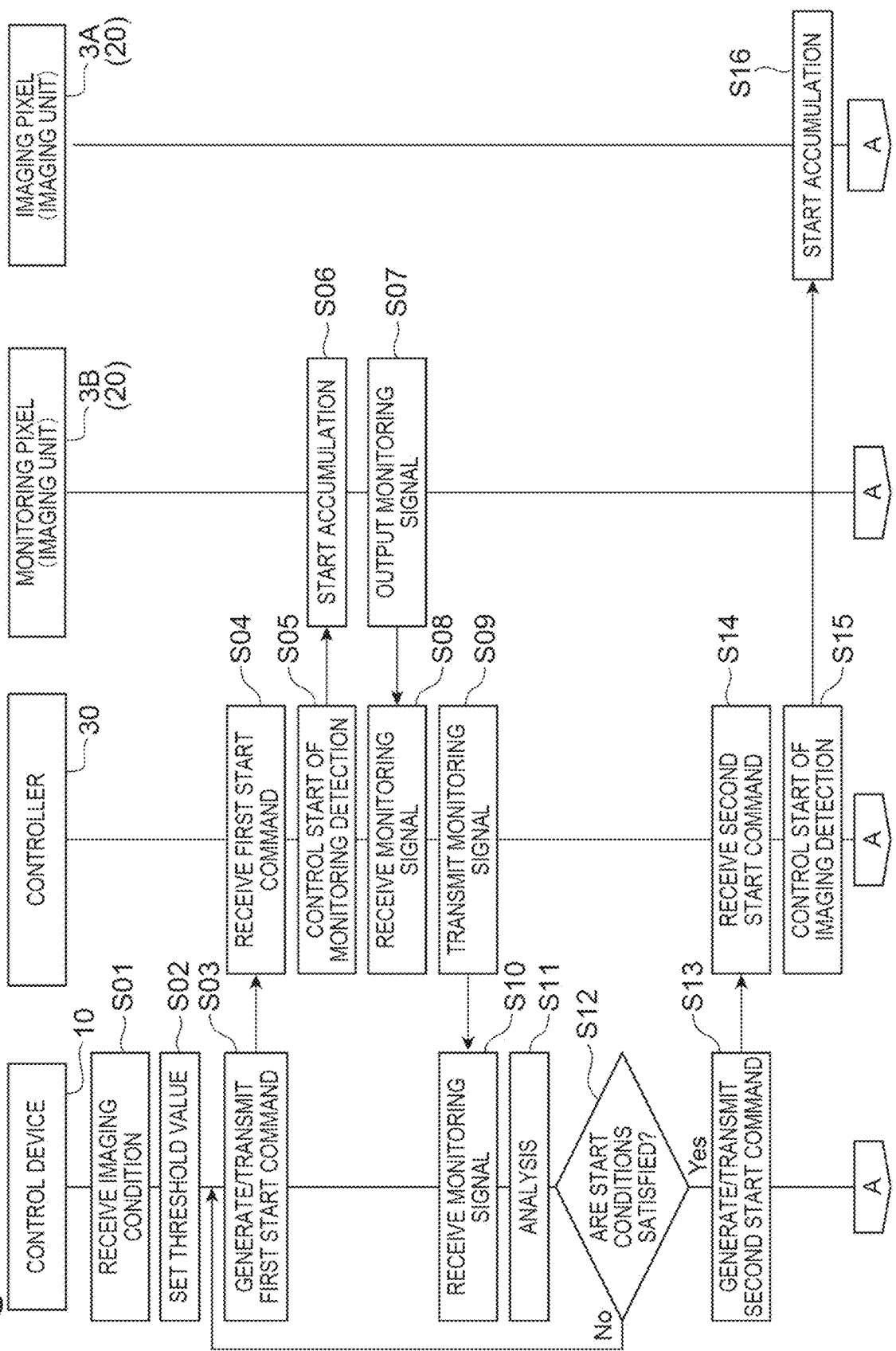
FIG. 4 is a sequence diagram showing the flow of processing from the reception of imaging condition to the start of imaging detection in imaging processing.
Figure 5:
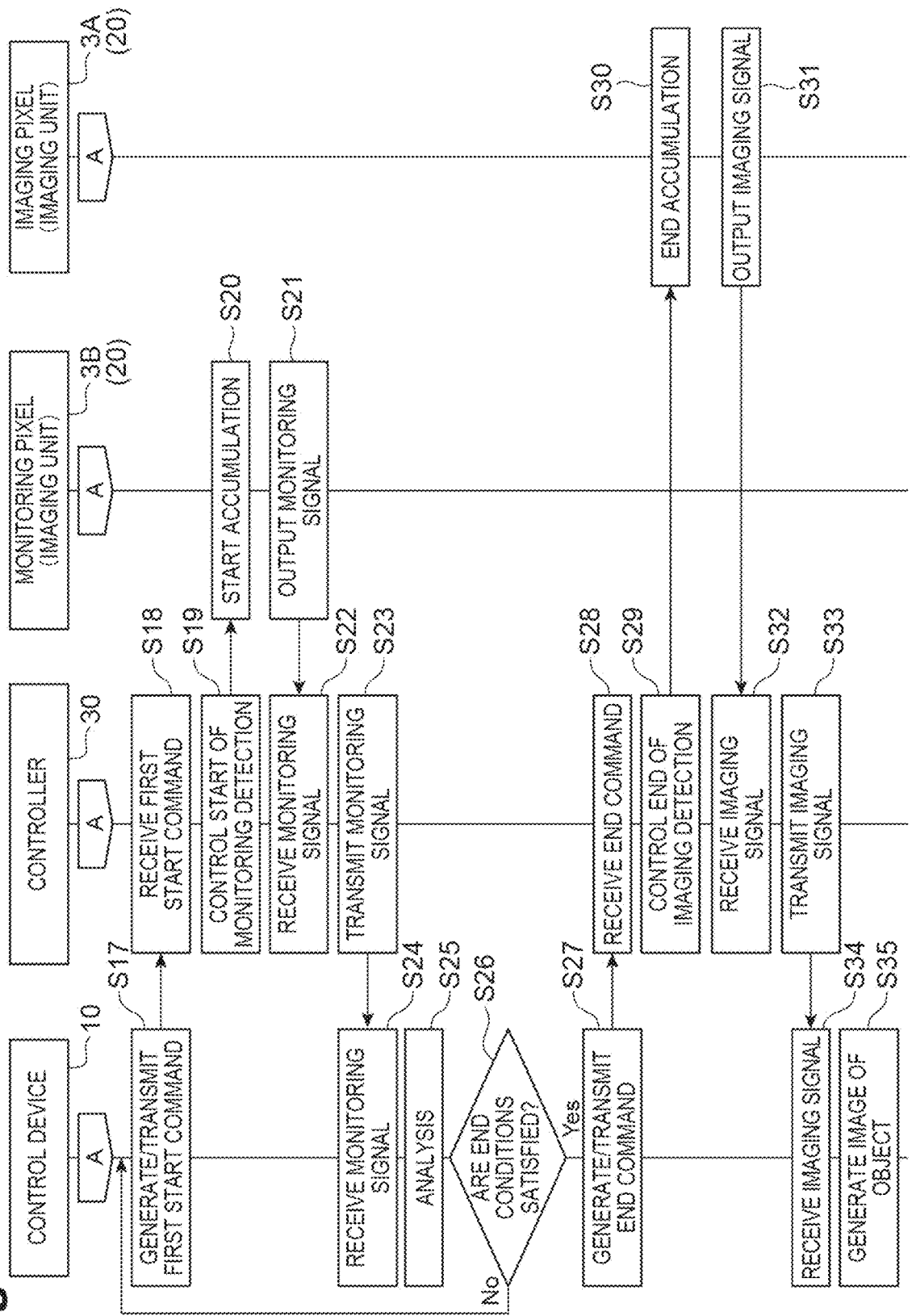
FIG. 5 is a sequence diagram showing the flow of processing from the second generation of a first start command to the acquisition of an image of an object in the imaging processing.

Imaging processing performed in the intra-oral imaging system 100 will be described with reference to FIGS. 4 and 5. FIG. 4 is a sequence diagram showing the flow of processing from the reception of imaging condition to the start of imaging detection in the imaging processing. FIG. 5 is a sequence diagram showing the flow of processing from the second generation of a first start command to the acquisition of an image of an object in the imaging processing. In addition, a radiation source in the imaging processing continuously emits X-rays with a fixed intensity.

First, as shown in FIG. 4, the control device 10 receives an input of an imaging condition being one of imaging conditions for an object from the user (step S01). The imaging condition is input by the user's input of object information and imaging method information to the input receiver 14. Then, the control device 10 sets a threshold value, which is used to determine the end timing of imaging detection, based on the input imaging condition (step S02). The control device 10 sets a threshold value corresponding to the input imaging condition with reference to the threshold value for each of the imaging conditions stored in the storage 11. Details of how to receive the input of the imaging condition and how to set the threshold value will be described later. Then, the control device 10 generates a first start command for starting imaging detection by the plurality of monitoring pixels 3B, and transmits the first start command to the controller 30 of the imaging device 1 (step S03). The controller 30 receives the first start command (step S04), and controls the imager 20 to start monitoring detection according to the first start command (step S05). Specifically, the controller 30 causes each monitoring pixel 3B of the imager 20 to start accumulating charges. Then, each monitoring pixel 3B starts accumulating charges (step S06). As a result, monitoring of the dose of radiation is started on the imaging device 1 side.

Then, each monitoring pixel 3B outputs a monitoring signal corresponding to the accumulated charges to the controller 30 when a predetermined period of time passes (step S07). Then, the controller 30 receives the monitoring signal from each of the plurality of monitoring pixels 3B (step S08), and transmits the monitoring signal to the control device 10 (step S09). The control device 10 receives the monitoring signal from the controller 30 (step S10), and performs a known analysis (for example, the analysis described in Japanese Patent No. 5715960) such as estimating the dose of radiation based on the monitoring signal (step S11). Then, the control device 10 determines whether or not the analysis result satisfies the conditions for starting imaging detection (step S12). If the control device 10 determines that the analysis result does not satisfy the conditions for starting imaging detection (step S12: NO), the process returns to step S03. On the other hand, if it is determined that the analysis result satisfies the conditions for starting imaging detection (step S12: YES), the control device 10 generates a second start command for starting imaging detection, and transmits the second start command to the controller 30 (step S13).

Then, the controller 30 receives the second start command (step S14), and controls the imager 20 to start imaging detection according to the second start command (step S15). Specifically, the controller 30 causes each imaging pixel 3A of the imager 20 to start accumulating charges. Then, each imaging pixel 3A starts accumulating charges (step S16). As a result, detection for acquiring an image of the object is started on the imaging device 1 side.

Then, as shown in FIG. 5, the control device 10 generates a first start command again and transmits the first start command to the controller 30 of the imaging device 1 (step S17). The controller 30 receives the first start command (step S18), and controls the imager 20 to start monitoring detection according to the first start command (step S19). Then, each monitoring pixel 3B of the imager 20 starts accumulating charges (step S20). As a result, in the imaging device 1, radiation detection for acquiring an image of the object is performed, and the dose of radiation is continuously monitored in order to acquire an appropriate image of the object.

Then, the imager 20 acquires a monitoring signal when a predetermined period of time passes, and outputs the monitoring signal to the controller 30 (step S21). The controller 30 receives the monitoring signal from the imager 20 (step S22), and transmits the monitoring signal to the control device 10 (step S23). The control device 10 receives the monitoring signal from the controller 30 (step S24), and performs an analysis based on the monitoring signal (step S25). Specifically, as the analysis described above, the control device calculates the total dose of radiation calculated based on the monitoring signal. Then, the control device 10 determines whether or not the analysis result satisfies the conditions for ending imaging detection (step S26). Specifically, the control device 10 determines whether or not the total dose of radiation calculated by the analysis exceeds the threshold value set in step S02. If the control device 10 determines that the analysis result does not satisfy the imaging detection end conditions (that is, the total dose of radiation does not exceed the threshold value set in step S02) (step S26: NO), the process returns to step S17. On the other hand, if it is determined that the analysis result satisfies the imaging detection end conditions (that is, the total dose of radiation exceeds the threshold value set in step S02) (step S26: YES), the control device 10 generates an end command for ending the imaging detection by the plurality of imaging pixels 3A, and transmits the end command to the controller 30 (step S27).

Then, the controller 30 receives the end command (step S28), and controls the imager 20 to end the imaging detection according to the end command (step S29). Then, each imaging pixel 3A ends accumulating charges (step S30), and outputs an imaging signal corresponding to the accumulated charges to the controller 30 (step S31). Then, the controller 30 receives the imaging signal from each of the plurality of imaging pixels 3A (step S32), and transmits the imaging signal to the control device 10 (step S33). Then, the control device 10 receives the imaging signal (step S34), and generates an image of the object based on the imaging signal (step S35). Thus, the imaging of the object ends.

[Threshold Value Setting Processing]

Figure 6:
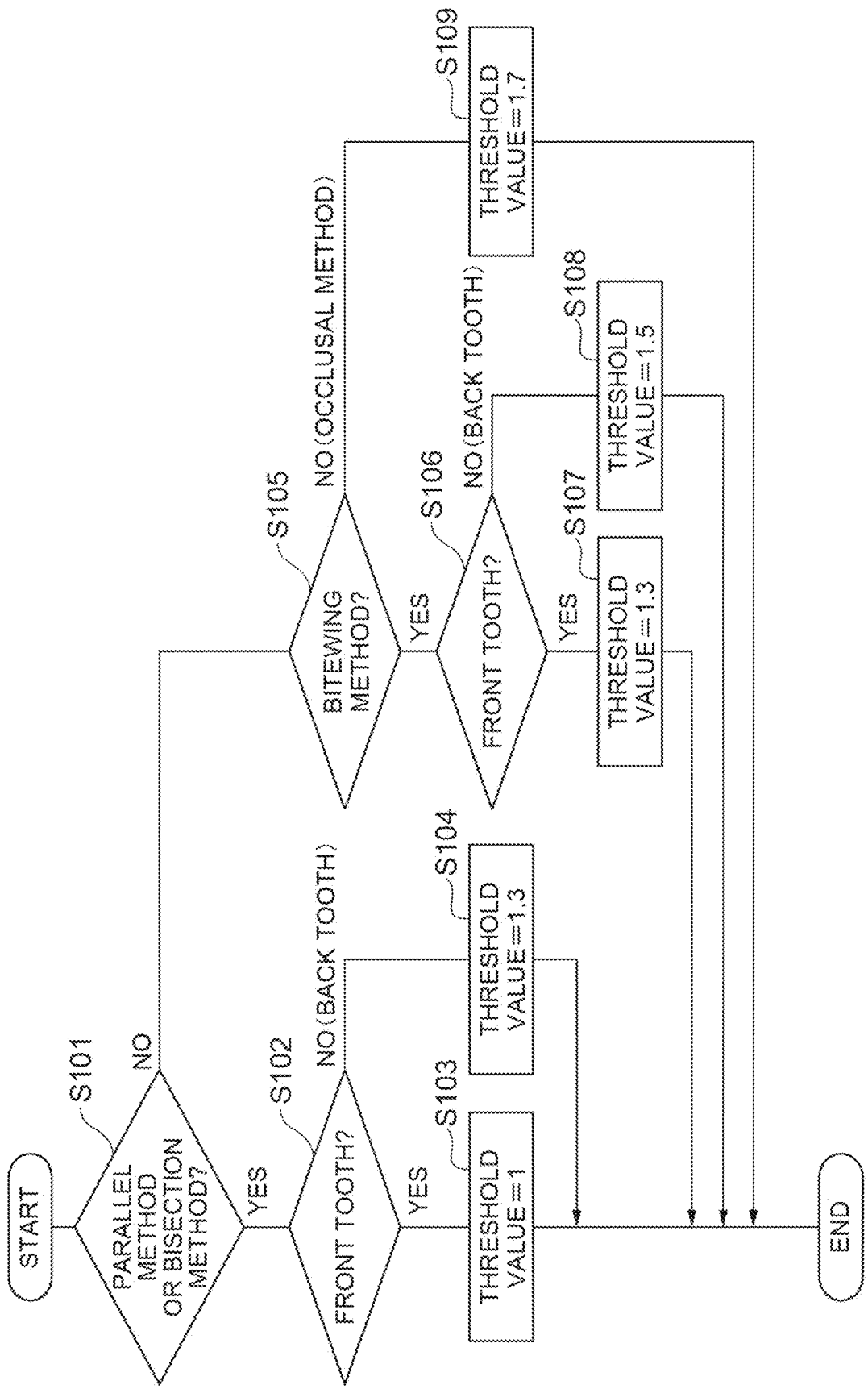
FIG. 6 is a flowchart showing the flow of threshold value setting processing.

Threshold value setting processing performed in step S02 of the imaging processing will be described with reference to FIG. 6. FIG. 6 is a flowchart showing a series of flow of threshold value setting processing. As a premise, the input of imaging condition from the user to the control device 10 has been completed (see step S01 in FIG. 4).

As an example, a screen for selecting the types of imaging method and object is displayed on the display 15 (see FIG. 3) of the control device 10, and the user inputs imaging condition (that is, object information and imaging method information) by operating the input receiver 14, such as a mouse, to select the types of imaging method and object. In the example shown in FIG. 6, one of the parallel method, the bisection method, the bitewing method, and the occlusal method is selected as an imaging method, and one of the back tooth and the front tooth is selected as an object. In addition, a threshold value is stored for each combination of the type of object and the type of imaging method in the storage 11 by the control device 10. Specifically, an appropriate threshold value is stored for each combination by the control device 10, such as a threshold value corresponding to the combination of the imaging method "parallel method" and the object "front tooth"="1". Specifically, in the parallel method, the bisection method, the bitewing method, and the occlusal method, the threshold value is set to be higher for an imaging method in which the proportion of the plurality of monitoring pixels 3B covered with intra-oral teeth, bones, and the like is higher. In addition, the threshold value is set to be higher when the object is a back tooth than when the object is the front tooth. The control device 10 sets a threshold value in the threshold setting processing by referring to the input imaging condition and the threshold value for each combination. In addition, the threshold value, the type of object, and the type of imaging method are not limited to this example.

First, the control device 10 determines whether or not the imaging method information included in the imaging condition indicates the parallel method or the bisection method (step S101). If it is determined that the imaging method information indicates the parallel method or the bisection method (step S101: YES), the control device 10 determines whether or not the object information indicates a front tooth (step S102). If it is determined that the object information indicates a front tooth (step S102: YES), the control device 10 sets the threshold value to "1" (step S103). On the other hand, if it is determined that the object information does not indicate a front tooth (in other words, object information indicates back tooth) (step S102: NO), the control device 10 sets the threshold value to "1.3" (step S104).

If it is determined in step S101 that the imaging method information does not indicate the parallel method or the bisection method (step S101: NO), the control device 10 determines whether or not the imaging method information indicates the bitewing method (step S105). If it is determined that the imaging method information indicates the bitewing method (step S105: YES), the imaging device determines whether or not the object information indicates a front tooth (step S106). If it is determined that the object information indicates a front tooth (step S106: YES), the control device 10 sets the threshold value to "1.3" (step S107). On the other hand, if it is determined that the object information does not indicate a front tooth (that is, the object information indicates a back tooth) (step S106: NO), the control device sets the threshold value to "1.5" (step S108). If it is determined in step S105 that the imaging method information does not indicate the bitewing method (that is, imaging method information indicates occlusal method) (step S105: NO), the control device 10 sets the threshold value to "1.7" (step S109). Through the threshold value setting processing described above, the imaging device sets a threshold value corresponding to the imaging condition.

[Functions and Effects]

In the intra-oral imaging system 100 including the imaging device 1, the control device 10 receives a monitoring signal related to the dose of radiation and transmits a control command to the controller 30, the control command generated based on the monitoring signal, and the controller 30 receives the control command and controls the imager according to the control command. Therefore, it is possible to determine the end timing of imaging of the object according to the type of object and/or the type of imaging method, for example. As a result, it is possible to appropriately acquire the image of the object. In addition, in the intra-oral imaging system 100, the imager 20 and the controller 30 are housed in the case 8. Therefore, it is possible to avoid a problem that occurs when the controller 30 is provided separately from the imager 20, that is, a problem that the controller 30 becomes an obstacle when the imager 20 is placed in the oral cavity. In addition, in the intra-oral imaging system 100, the control device 10 generates a control command based on the monitoring signal. Therefore, it is possible to reduce the processing load of the controller on the imaging device 1 side. As a result, it is possible to reduce the size of the imaging device 1 and suppress the heat generation of the imaging device 1. As described above, according to the intra-oral imaging system 100 and the imaging device 1, it is possible to appropriately acquire the image of the object, improve the handleability of the imaging device 1, and suppress the heat generation of the imaging device 1 in the oral cavity.

The effects of the intra-oral imaging system 100 will be further described. In the intra-oral imaging system 100, the imaging device 1 includes the controller 30. The controller 30 converts the imaging signal and the monitoring signal into signals conforming to the communication protocol of the general-purpose communication standard (USB standard) and transmits the signals to the control device 10, and controls the imager 20 according to the control command received from the control device 10. Thus, since the imaging device 1 includes the controller 30 separately from the control device 10 that substantially controls the imager 20 by generating a control command for controlling the imager 20, the communication between the imaging device 1 and the control device 10 can be communication conforming to the general-purpose communication standard. As a result, the communication between the imaging device 1 and the control device 10 can be realized with a simple configuration. In addition, when an FPGA is adopted as the control circuit 6 that is a component of the controller 30, each control command received from the control device can be reliably processed at appropriate timing, and the cost can be reduced. In addition, for example, providing the image sensor 3 with a function equivalent to that of the controller 30 instead of providing the controller 30 in the imaging device 1 is not realistic in terms of cost and the like.

In addition, for example, when the controller 30 is placed outside the oral cavity, the imager 20 and the controller 30 are electrically connected to each other by a first cable (not shown), and the controller 30 and the control device 10 are electrically connected to each other by a second cable (not shown), there is a concern about the risk of breakage and failure in the controller 30, a connection portion between the controller 30 and the first cable, and a connection portion between the controller 30 and the second cable. On the other hand, in the intra-oral imaging system 100, since the controller 30 is housed in the case 8, such a risk can be avoided. In addition, in the intra-oral imaging system 100, since the number of cables can be reduced as compared with that in the example described above, it is possible to reduce the number of components.

In addition, in the intra-oral imaging system 100, the control device 10 performs various processes, such as generation of a control command and analysis of a monitoring signal. Therefore, it is possible to easily change various processes, such as changing and adding imaging conditions, threshold values, and the like.

In the intra-oral imaging system 100, the control device 10 generates an image of the object based on the imaging signal. Therefore, it is possible to reliably generate an image of the object.

In the intra-oral imaging system 100, the control command includes an end command for ending imaging detection, and the controller 30 controls the imager 20 to end imaging detection when the end command is received. Therefore, it is possible to end the radiation detection for acquiring an image of the object at an appropriate timing according to the type of object and/or the type of imaging method, for example. As a result, it is possible to appropriately acquire the image of the object.

In the intra-oral imaging system 100, the control device 10 calculates the total dose of radiation in the plurality of imaging pixels 3A of the image sensor 3 based on the monitoring signal, and generates an end command when the calculated total dose of radiation exceeds a predetermined threshold value. Therefore, it is possible to end the radiation detection for acquiring an image of the object with an appropriate total dose according to the type of object and/or the type of imaging method, for example. As a result, it is possible to appropriately acquire the image of the object. In addition, according to the intra-oral imaging system 100, the timing of ending the radiation detection processing for acquiring the image of the object is automatically adjusted in the imaging device 1 based on the monitoring signal. Therefore, it is possible to eliminate the need to adjust the dose of radiation and the emission time.

In the intra-oral imaging system 100, A threshold value is stored for each of the imaging conditions for the object by the control device 10, and the control device 10 receives an input of an imaging condition being one of the imaging conditions, and sets a threshold value corresponding to the imaging condition. Therefore, since an appropriate threshold value is set according to the input imaging condition, an image of the object can be appropriately acquired regardless of the type of object and/or the type of imaging method, for example.

In the intra-oral imaging system 100, the control device 10 receives imaging condition including object information regarding the object, and sets a threshold value corresponding to the object information. Therefore, since an appropriate threshold value is set according to the object to be imaged, it is possible to appropriately acquire the image of the object regardless of the type of object.

In the intra-oral imaging system 100, the control device 10 receives imaging condition including imaging method information regarding an object imaging method, and sets a threshold value corresponding to the imaging method information. Therefore, since an appropriate threshold value according to the object imaging method is set, it is possible to appropriately acquire the image of the object regardless of the type of imaging method.

In the intra-oral imaging system 100, the controller 30 is configured to be able to communicate with the control device 10 by wire. Therefore, it is possible to secure a stable communication environment between the controller 30 and the control device 10. In addition, since the imager 20 and the controller 30 are housed in the single case 8, the problem that the controller 30 becomes an obstacle when the imager 20 is placed in the oral cavity can be avoided even in a configuration in which the controller 30 and the control device 10 are physically connected to each other by wire.

Modification Examples

While the embodiment of the present disclosure has been described above, the present disclosure is not limited to the above embodiment. For example, the imager 20 only needs to perform imaging detection and monitoring detection. As an example, the imager 20 may be formed only by the image sensor 3 and the scintillator 5, or the imager 20 may be formed only by a direct conversion type imaging device that generates charges when radiation is incident. In addition, the controller 30 only needs to be configured to be able to communicate with the control device 10, receive a control command, and control the imager 20 according to the control command. As an example, the controller 30 may include components other than the control circuit 6 and the communication module 7 in addition to the control circuit 6 and the communication module 7 or instead of the control circuit 6 and the communication module 7. In addition, in the embodiment described above, the image sensor 3 includes a plurality of imaging pixels 3A and a plurality of monitoring pixels 3B. However, the image sensor 3 may include only one pixel region, and may be configured to output an imaging signal and a monitoring signal in the imaging region. In addition, the switch SW1 and the switch SW2 may be provided outside the image sensor 3.

The intra-oral imaging system 100 may include a plurality of imaging devices 1. A plurality of such imaging devices 1 can be placed, for example, in the oral cavity of an animal Hereinafter, an example in which the intra-oral imaging system 100 includes two imaging devices 1 will be described. In such an intra-oral imaging system 100, for example, it is assumed that one imaging device 1 is placed on the back side in the oral cavity of an animal and the other imaging device 1 is placed on the front side in the oral cavity. In this case, the control device 10 transmits an end command to the controller 30 of each imaging device 1 when the monitoring signal of one of the two imaging devices 1 exceeds a threshold value. That is, the control device 10 causes both the imaging devices 1 to end radiation detection for acquiring an image of the object. Therefore, it is possible to prevent a plurality of imaging pixels 3A of each imaging device 1 from being saturated. Therefore, according to the intra-oral imaging system 100 of this modification example, even when imaging an intra-oral object in which the proportion of teeth and bones is significantly different between the back side and the front side, it is possible to end the radiation detection for acquiring an image of the object with an appropriate total dose. As a result, it is possible to appropriately acquire an image of the object.

In addition, the controller 30 and the control device 10 may be configured to be able to communicate with each other wirelessly (for example, through LAN, Bluetooth (registered trademark), or Wifi).

The imaging processing by the intra-oral imaging system 100 is not limited to the embodiment described above. For example, the control device 10 may set a threshold value based on one of the object information and the imaging method information, or may set a threshold value according to imaging condition different from the object information and the imaging method information. For example, the control device 10 may generate only the end command. In this case, the controller 30 may start monitoring detection, for example, when a predetermined period of time passes. In addition, in the intra-oral imaging system 100, the control device 10 may generate other control commands.

In addition, each step shown in the sequence diagrams (FIGS. 4 and 5) of the imaging method described above and each step shown in the flowchart (FIG. 6) of the threshold value setting method described above may be omitted as appropriate. In addition, the order of each step may be changed as appropriate.

REFERENCE SIGNS LIST

1: imaging device, 8: case, 10: control device, 20: imager, 30: controller, 100: intra-oral imaging system.

The invention claimed is:

1. An intra-oral imaging system, comprising:
an imaging device that detects radiation transmitted through an object while being placed in an oral cavity; and
a control device electrically connected to the imaging device,
wherein the imaging device includes:
an imager that detects the radiation;
a controller that is configured to be communicable with the control device and controls the imager; and
a case in which the imager and the controller are housed,
wherein the control device is disposed outside the case,
the imager performs first detection for detecting the radiation in order to acquire an image of the object and second detection for detecting the radiation in order to monitor a dose of the radiation,
the controller transmits a first signal and a second signal to the control device, the first signal acquired by the first detection and the second signal acquired by the second detection,
the control device receives the first signal and the second signal and transmits a control command to the controller, the control command generated based on the second signal, and
the controller receives the control command and controls the imager according to the control command.

2. The intra-oral imaging system according to claim 1, wherein the control device generates the image of the object based on the first signal.

3. The intra-oral imaging system according to claim 1, wherein the control command includes an end command for ending the first detection, and
the controller controls the imager to end the first detection when the end command is received.

4. The intra-oral imaging system according to claim 3, wherein the control device generates the end command when a total dose of the radiation calculated based on the second signal exceeds a predetermined threshold value.

5. The intra-oral imaging system according to claim 4, wherein the threshold value is stored for each of imaging conditions for the object by the control device, and
the control device receives an input of an imaging condition being one of the imaging conditions, and sets the threshold value corresponding to the imaging condition.

6. The intra-oral imaging system according to claim 5, wherein the control device receives the imaging condition including object information regarding the object, and sets the threshold value corresponding to the object information.

7. The intra-oral imaging system according to claim 5, wherein the control device receives the imaging condition including imaging method information regarding a method for imaging the object, and sets the threshold value corresponding to the imaging method information.

8. The intra-oral imaging system according to claim 1, wherein the controller is configured to be communicable with the control device by wire.

9. An imaging device for detecting radiation transmitted through an object while being placed in an oral cavity, comprising:
an imager that detects the radiation;
a controller that is configured to be communicable with a control device and controls the imager; and
a case in which the imager and the controller are housed,
wherein the control device is disposed outside the case,
wherein the imager performs first detection for detecting the radiation in order to acquire an image of the object and second detection for detecting the radiation in order to monitor a dose of the radiation, and
the controller transmits a first signal and a second signal to the control device, receives a control command from the control device, and controls the imager according to the control command, the first signal acquired by the first detection and the second signal acquired by the second detection.

10. The intra-oral imaging system according to claim 1, wherein the control command includes at least one of a first start command for starting the second detection and a second start command for starting the first detection.

* * * * *